Figure 1:
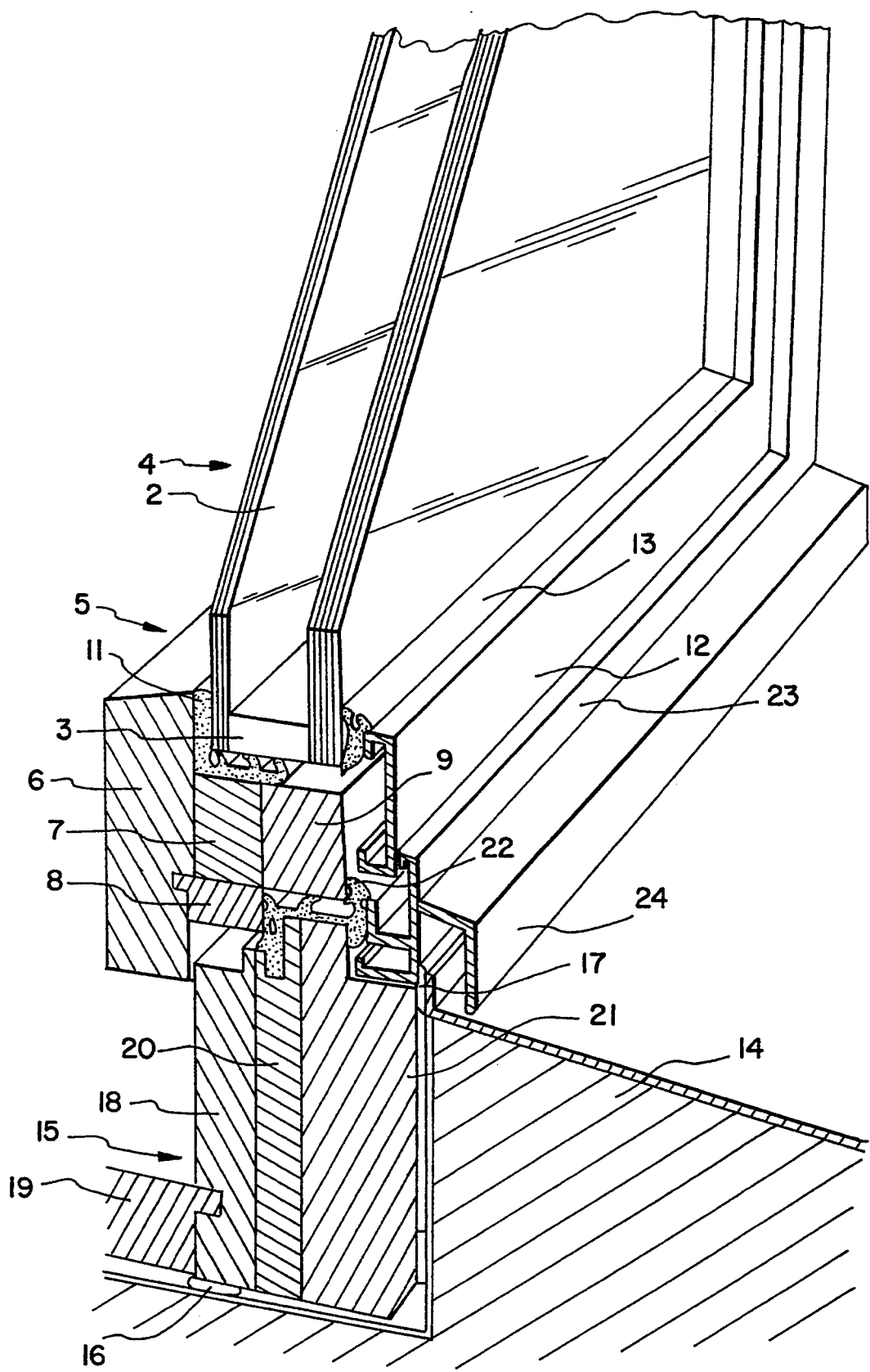

United States Patent

Roth et al.

[11] Patent Number: 5,373,671
[45] Date of Patent: Dec. 20, 1994

[54] STATICALLY STABLE FRAME WITH FULL THERMAL BREAK FOR WINDOWS AND FACADE ELEMENTS

[75] Inventors: Fritz Roth; Christoph Haring, both of Fullinsdorf, Switzerland

[73] Assignee: Harin & Co. AG, Pratteln, Switzerland

[21] Appl. No.: 842,099

[22] PCT Filed: Jul. 22, 1991

[86] PCT No.: PCT/CH91/00152
§ 371 Date: May 19, 1992
§ 102(e) Date: May 19, 1992

[87] PCT Pub. No.: WO92/01853
PCT Pub. Date: Feb. 6, 1992

[30] Foreign Application Priority Data

Jul. 20, 1990 [CH] Switzerland ............ 2425/90

[51] Int. Cl.⁵ ............................................ E06B 7/00
[52] U.S. Cl. ............................ 52/204.1; 52/208; 52/209; 52/788
[58] Field of Search ............ 52/204.1, 209, 788, 52/790, 172, 208

[56] References Cited

U.S. PATENT DOCUMENTS

| | | | |
|---|---|---|---|
| 2,219,688 | 10/1940 | Knudsen | 52/208 |
| 3,703,063 | 11/1972 | Budich et al. | 52/204.1 |
| 3,919,815 | 11/1975 | Alabaster | 52/204.1 |
| 4,608,796 | 9/1986 | Shea, Jr. | 52/209 |
| 4,715,152 | 12/1987 | Tanikawa | 52/209 |
| 4,873,803 | 10/1989 | Rundo | 52/208 |
| 4,897,975 | 2/1990 | Artwick et al. | 52/208 |

Primary Examiner—Carl D. Friedman
Assistant Examiner—Wynn E. Wood
Attorney, Agent, or Firm—H. Jay Spiegel

[57] ABSTRACT

In order to obtain frames, in particular for windows, that without excessive depths of construction provide insulating values approximately the same as those of the insulating panes, a mechanically stable frame is disclosed, having a full thermal break between inner (5) and outer frames, without any heat bridge. For that purpose, both frames are composed of inner and outer continuous parts (6 and 9, 18 and 21) between which is laid an insulating element (7, 20) capable of receiving and transmitting mechanical forces. The pane (4) to be mounted in the inner frame (5) is also thermally insulated from the frame parts (6, 9, 12) by means of lip seals (11, 13). In order to seal the gap between the inner (5) and outer (15) frames, at least one further lip seal (22) is provided.

6 Claims, 3 Drawing Sheets

STATICALLY STABLE FRAME WITH FULL THERMAL BREAK FOR WINDOWS AND FACADE ELEMENTS

The present invention relates to a statically stable frame with full thermal break intended to frame windows and facade elements as disclosed in the disclosure part of claim 1.

Window frame structures for windows and for the fixation of facade elements to a building have long been known. Recently, however, the requirement that such constructions have a high insulation value, in other words a low k-value and if at all possible no cold bridges, in other words that there should be a complete thermal break, has gained in importance. Especially for the construction of windows, in recent years constructions have been known which attain acceptable average insulation values with use of two or three glass panes. The frames used for that type of construction, corresponding to the fashions of the time, have most often been realized of plastic or light metal, predominantly aluminum and aluminum alloys, and do not attain the k-value of about 0.8, attainable by the multiplicity of glass panes. For the most part, they assume constructions which do not include complete thermal breaks and have an insulation value or k-value of approximately 1.7 or higher, which consequently is without any doubt poorer insulation than that of the panes.

In modern conventional structures with masonry wall parts or particularly solid wall parts wherein the window frames make up about 30% of the facade surface, this factual situation regarding poor insulation is a considerable drawback. Therefore the object of the invention is to disclose a frame for windows and facade elements which overcomes these drawbacks and facilitates the attainment of a k-value of approximately 0.8.

This object is attained according to the invention by a frame construction as described in claim 1.

One advantageous exemplary embodiment of a frame construction according to the invention is to be described in the following relative to the example of a window frame shown in the drawing. In the drawing FIG. 1 is a vertical section through a perspective of a window with a frame construction according to the invention, in the region of the bottom vertical part of the frame, FIG. 2 is a detail of the individual elements of the frame shown in a vertical cross section through the bottom vertical frame part, FIG. 3 is a corresponding vertical cross section through a part of the frame construction at the site of the pane-holding block supporting the glass panes, and FIG. 4 is a horizontal section through the frame in the region of one of its vertical parts.

Figure 2:
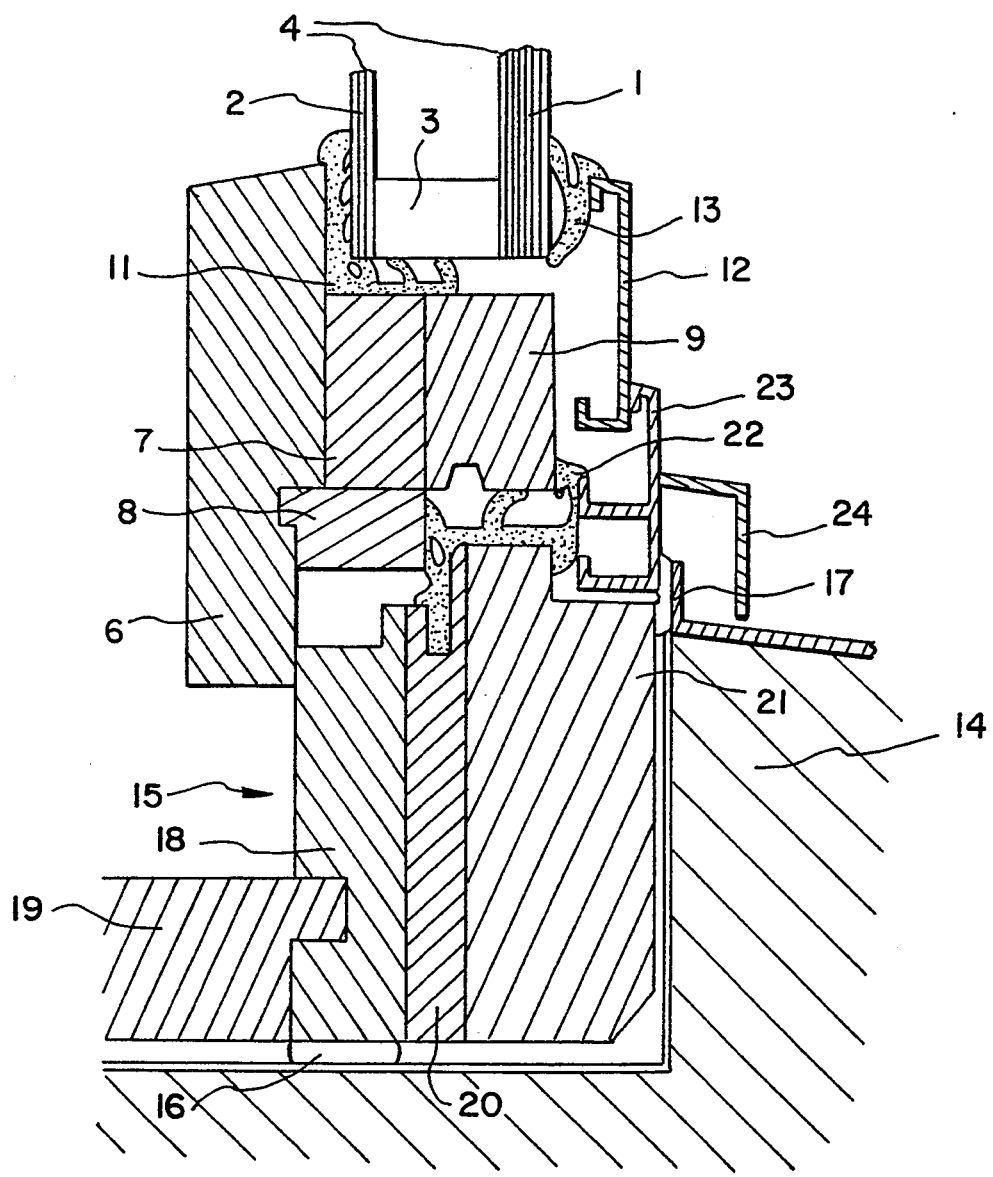
Figure 4:
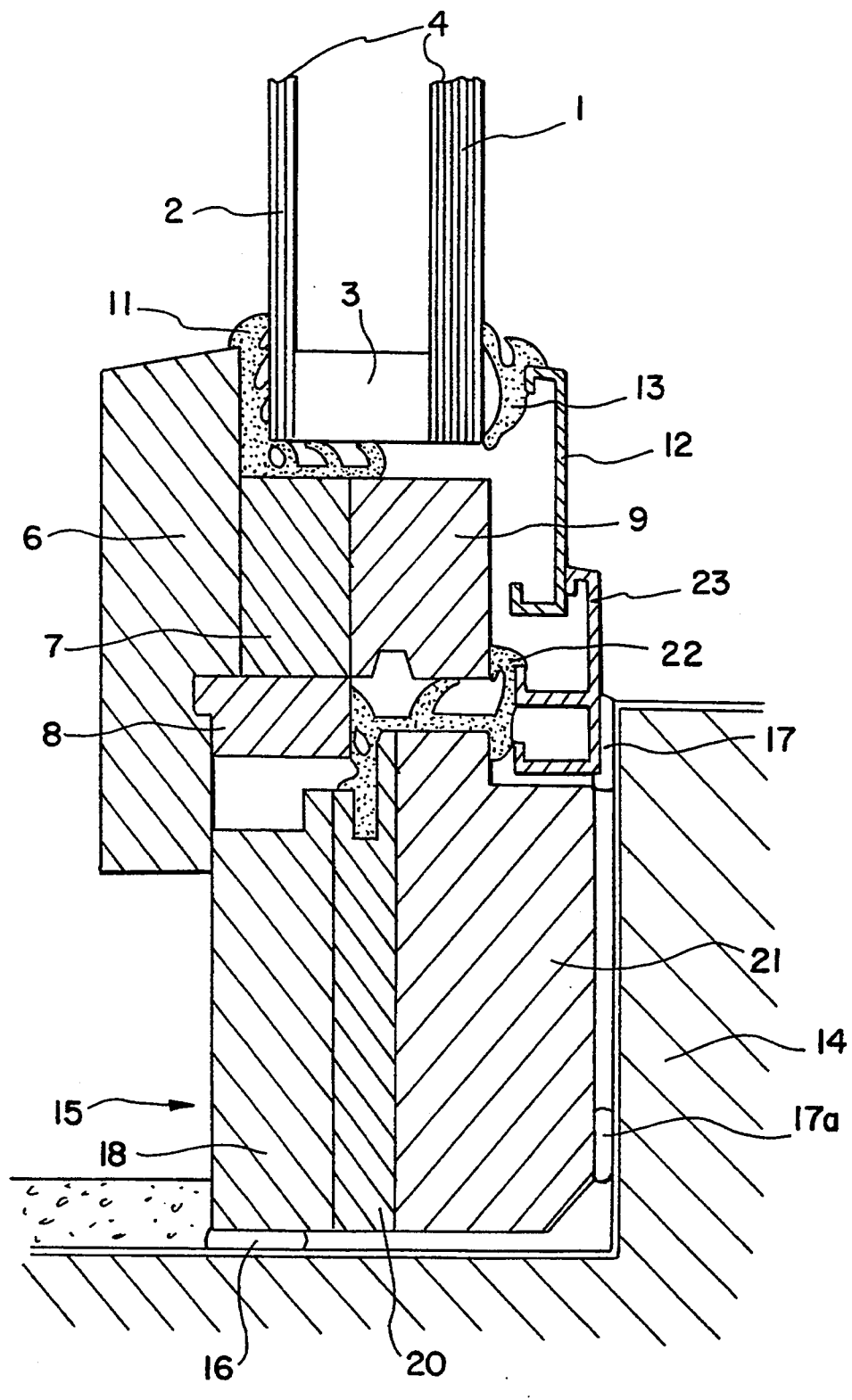

A double-pane window with outside pane 1 and inside, traditionally somewhat thinner, pane 2, which are advantageously held together in a known manner by means of edging crosspieces 3 to form a double pane 4 and to define the two sides of a hollow space which is advantageously evacuated or is filled with inert gas or dry air is shown in FIGS. 1, 2 and 4, This double pane 4, as with traditional windows, is advantageously inserted into an inside frame 5 to be able to pivot at least around a vertical axis, the frame advantageously consisting primarily of wood and having an inside frame part 6 running all the way around the window, with which is connected a first insulation element 7 which likewise runs all the way around the window. Element 7 is supported on an inside frame transverse part 8 which is mechanically tightly connected with inside frame part 6 and supports an outer inside frame part 9, which advantageously likewise is of wood. The cited first insulation element 7 is advantageously a sandwich element with mechanically tight outside plates and a rigid foam core, which can receive or respectively can transfer forces, even shearing forces, into the outside frame.

Figure 3:
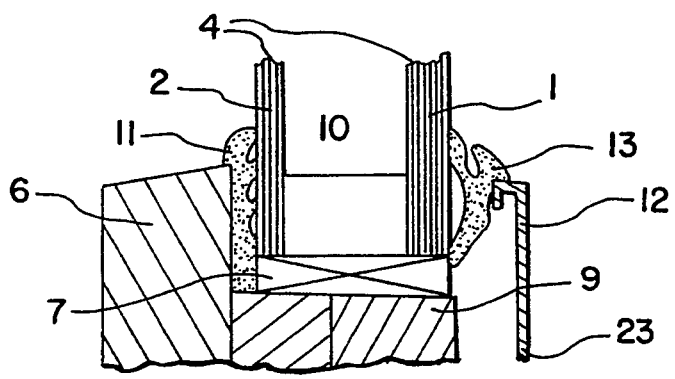

As shown in FIG. 3, double pane 4 is supported in a known manner in the region of the pivot axis of the window casement standing vertical and not visible in the drawing by means of a pane-holding block 10 supported on first insulation element 7 and outer inside frame part 9. Between inner inside frame part 6 and double pane 4 and also between first insulation element 7 and outer inside frame part 9 and double pane 4 is located a first lip gasket 11, which extends into the region of the front of double pane 4 but advantageously not over the entire pane thickness, so that condensation water which may appear in this region is not found in a closed space and can flow out and/or can be diluted.

As shown in FIGS. 1 to 4, an inside frame outer part 12 running all the way around the window is provided on the outside of outside pane 1, which part 12 is connected through not shown support elements with the outer inside frame part 9 and is supported by means of a second lip gasket 13 against pane 1 and inside frame 5, which in this case is configured as a window casement, sealed off from the outside. This inside frame outer part 12 can advantageously consist of an aluminum profile. Between it, the two lip gaskets 11 and 13, double pane 4 and outer inside frame part 9 is located a hollow space in which air is recirculated even when the window casement is closed, since an opening remains permanently between inside frame outer part 12 and outer inside frame part 9.

As is traditionally advantageous, an outside frame 15 is supported on gaskets 16, 17 and 17a on a masonry or the like part 14 of the structure of a building. It includes an inner outside frame part 18 running all the way around, which can be Connected on its horizontal bottom inside surface with 2a window sill 19 and to which attaches on the outer side a second insulation element 20 running all the way around, and which supports an outer outside frame part 21 running all the way around the window.

A third lip gasket 22 running all the way around the window is advantageously connected with the second insulation element 20 and the outer outside frame part 21, and this gasket on the one hand serves the inside frame transverse part 8 when the window is being closed, as a soft stop against outside frame 15, and on the other hand compounds the seal over the groove found between inside frame 5 and outside frame 15. The outside of this third lip gasket 22 is covered by an outside frame sealing part 23 running all the way around, advantageously in the form of an aluminum profile, which can be connected in its bottom horizontal part with a covering profile 24, which prevents the penetration of precipitation between outside frame 15 and masonry 14. Outside frame sealing member 23 is connected by means of not shown support elements with outer outside frame part 21.

It is known to the expert that both inside and outside frames 5 and 15 can consist of statically stable construction elements which from the outside toward the inside have complete thermal breaks and have no cold bridges whatsoever. The described frame construction consequently optimally fulfills the purpose of the present invention. If the various different frame parts 5, 6, 9, 18 and 21 are wood, and rigid foam plates are used for insulation elements 7 and 20, then a window frame according to the invention can be realized without excess frame structural thickness, said window frame having a k-value of 0.8 or lower and consequently having the insulation capacity of a double pane. The use of wood as primary construction material for the frame construction according to the ivention, as compared with plastic or metal, also incorporates advantageous strength and contact capacity. Of course plastic or metal materials could also be used, when certain conditions so indicate.

Although the frame construction according to the invention has been described and illustrated relative to a window, the expert in the art is well aware that, with frame constructions adapted to individual relevant conditions, for instance those of a concrete structure, the inside frames can be reduced to the relevant structure, and can even be used for fixing of facade parts to buildings.

We claim:

1. Frame construction for windows and facade elements, including an inside and an outside frame (5, 15), between which an open groove is present at all times, characterized in that each of the frames is constructed as a sandwich element, the inside frame (5) having a mechanically tight, inner inside frame part (6) surrounding a periphery of a window, to which said inner inside frame part is detachably attached and sealed from outside, a first insulation element (7) surrounding said periphery and a mechanically tight inside frame transverse part (8) surrounding said periphery, said first insulation element being connected with an outer inside frame part (9) surrounding said periphery, which in turn is mechanically tightly connected with an inside frame outer part (12) whereby a window glass (4) or a facade element can be supported between first and second lip gaskets (11, 13) surrounding said periphery, connected with said inner inside frame part (6) or said outer inside frame part (12) by means of a pane-holding block (10) engaging against said first insulation element (7) and the outer inside frame part (9), and in which said outside frame (15) includes a mechanically tight inner outside frame part (18) surrounding said periphery, on which is detachably attached, sealed from outside, a second insulation element (20) surrounding said first insulation element, which second insulation element supports an outer outside frame part (21) surrounding said periphery, with which is mechanically tightly connected an outside frame seal part (23).

2. Frame construction as in claim 1, characterized in that at least some of the following frame parts are made of wood: the inner inside frame part (6), the inside frame transverse part (8), the outer inside frame part (9), the inner outside frame part (18), and the outer outside frame part (21).

3. Frame construction as in claim 1, characterized in that the outer inside frame part (12) and the outside frame seal part (23) are made of aluminum or special non-corrosive metals.

4. Frame construction as in any one of claims 1, 2 or 3, characterized in that said first lip gasket extends over only a part of said first insulation element (7) and said outer inside frame part (9) which is attached thereto outside thereof.

5. Frame construction as in any one of claims 1, 2 or 3, characterized in that said outside frame (15) has a third lip gasket (22) which seals a groove located between said inside frame (5) and said outside frame (15).

6. Frame construction as in any one of claims 1, 2 or 3, characterized in that said insulation elements (7, 20) are plates which receive and transmit mechanical forces, and which are made of rigid foam plates.

* * * * *